United States Patent
Walker et al.

(10) Patent No.: US 6,507,822 B1
(45) Date of Patent: Jan. 14, 2003

(54) METHOD AND APPARATUS FOR MANAGING THE SALE OF AGING PRODUCTS

(75) Inventors: Jay S. Walker, Ridgefield, CT (US); Andrew S. Van Luchene, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/563,715

(22) Filed: May 2, 2000

Related U.S. Application Data

(63) Continuation of application No. 08/943,965, filed on Oct. 6, 1997, now Pat. No. 6,119,100.

(51) Int. Cl.[7] .............................................. G06F 17/60
(52) U.S. Cl. ........................................... 705/20; 705/37
(58) Field of Search .............................. 705/37, 20, 26, 705/27

(56) References Cited

U.S. PATENT DOCUMENTS

| | | | | |
|---|---|---|---|---|
| 3,581,072 A | * | 5/1971 | Nymeyer ...................... | 705/37 |
| 4,674,044 A | * | 6/1987 | Kalmus et al. ................ | 705/37 |
| 5,642,279 A | | 6/1997 | Bloomberg et al. ......... | 395/214 |
| 5,664,115 A | * | 9/1997 | Fraser .......................... | 705/37 |
| 5,758,328 A | * | 5/1998 | Giovannoli ................... | 705/26 |
| 5,794,219 A | * | 8/1998 | Brown ......................... | 705/37 |
| 5,799,308 A | | 8/1998 | Dixon ........................ | 707/100 |
| 5,826,244 A | * | 10/1998 | Huberman ................... | 705/37 |
| 5,873,069 A | | 2/1999 | Reuhl et al. .................. | 705/20 |
| 5,988,498 A | | 11/1999 | Hoell .......................... | 235/383 |

FOREIGN PATENT DOCUMENTS

| | | | | |
|---|---|---|---|---|
| JP | 05-225451 | * | 9/1993 | ........... G06F/15/21 |

OTHER PUBLICATIONS

How to minimize markdowns and realize higest gross profit, Levy Neil; gertler Peter, Discount Store News, v25 pp. 95 (1), Aug. 1986.*
Catalano, Joe, "Developments," Newsday, p. 3, Jan. 13, 1990.
Albright, Mark, "Syms' strategy: drab stores, no sales, no credit cards" St. Petersburg Times, p. 1I, Mar. 29, 1992.
Garrett, Diane, "Synergy, Retail Style," Video Store, p. 22, Nov. 26, 1995, Dialog: File 16, Acct. # 04089291.
"Onsale Live Auction" http://www.onsale.com/ (download date: May 26, 1997).
"U–Auction–It™—A Great Place to Buy & Sell!" http://www.uauction.com/about.htm (download date: Jan. 22, 1998).

* cited by examiner

*Primary Examiner*—Kenneth R. Rice
*Assistant Examiner*—Lynda Jasmin
(74) *Attorney, Agent, or Firm*—Dean P. Alderucci

(57) ABSTRACT

A store controller stores a series of prices for a product and respective effective periods during which the prices are effective. A customer submits an offer to buy the product at an "offer price" that is one of the series of prices. The offer also has an offer period that elapses when the respective effective period of the product price elapses. The offer period thereby defines a period during which the offer is effective and after which the offer cannot be accepted. Each offer further specifies (i) a customer identifier for identifying the customer, and (ii) funds or a payment identifier for specifying an account from which funds (typically the offer price) may be collected if the offer is accepted. The store controller then determines whether to accept the offer. If the offer is accepted, the store controller (i) initiates use of the payment identifier, if any, to collect the funds, and (ii) uses the customer identifier to identify the customer as having paid for the product. Thus, the customer pays for the product and the seller must deliver the product or otherwise inform the customer that the product has been sold to him.

8 Claims, 19 Drawing Sheets

FIG. 5

| OFFER IDENTIFIER 173 | PRODUCT IDENTIFIER 174 | OFFER PRICE 176 | CUSTOMER IDENTIFIER 178 | PAYMENT IDENTIFIER 180 | OFFER PERIOD 181 |
|---|---|---|---|---|---|
| 1 | 1111 | $7.50 | AVL 204 | MC 12345678 | UNTIL JAN. 18, 1999 |
| 2 | 3333 | $50.00 | DPA 100 | VI 24680139 | UNTIL JUNE 15, 1999 |

148

170
172

| ACCEPTANCE IDENTIFIER 196 | OFFER IDENTIFIER 198 | DATE ACCEPTED 200 |
|---|---|---|
| A | 17 | JAN. 3, 1999 |
| B | 1 | JAN. 2, 1999 |
| C | 22 | MAR. 10, 1999 |

FIG. 6

|  | PRODUCT IDENTIFIER 206 | QUANTITY 208 |
|---|---|---|
| → | 1111 | 17 |
| → | 3333 | 0 |

| PRODUCT IDENTIFIER | PRODUCT PRICE | EFFECTIVE PERIOD |
|---|---|---|
| 1111 | $10.00 | JAN. 1, 1999 - JAN. 31, 1999 |
| 1111 | $7.50 | FEB. 1, 1999 - FEB. 28, 1999 |

220

| OFFER IDENTIFIER | PRODUCT IDENTIFIER | OFFER PRICE | CUSTOMER IDENTIFIER | PAYMENT IDENTIFIER |
|---|---|---|---|---|
| 1 | 1111 | $7.50 | AVL 204 | MC 12345678 |

230

| PRODUCT IDENTIFIER | QUANTITY |
|---|---|
| 1111 | 17 |

240

| ACCEPTANCE IDENTIFIER | OFFER IDENTIFIER | DATE ACCEPTED |
|---|---|---|
| B | 1 | JAN. 2, 1999 |

FIG. 8

| STORE IDENTIFIER 484 | ADDRESS 486 | NETWORK ADDRESS 488 |
|---|---|---|
| 1 | 1 MAIN ST. CHICAGO, IL | 11.22.33 |
| 2 | 1 HIGH ST. NEW YORK, NY | 44.55.66 |

FIG. 17

METHOD AND APPARATUS FOR MANAGING THE SALE OF AGING PRODUCTS

This application is a continuation of U.S. patent application Ser. No. 08/943,965, filed Oct. 6, 1997 for "METHOD AND APPARATUS FOR MANAGING THE SALE OF AGING PRODUCTS" now U.S. Pat. No. 6,119,100.

FIELD OF THE INVENTION

The present invention relates to methods and apparatus for managing the sale of products and, more particularly, to methods and apparatus for managing the sale of aging products.

BACKGROUND OF THE INVENTION

Retail stores and other sellers often cannot "move" (sell) products as fast as desired. It is particularly difficult to sell aging products, since aging products may have become unfashionable, out of season, less useful or otherwise less desirable to customers. Retaining aging products occupies space needed for better selling products, and, even worse, can make other products appear unattractive by association.

If a product has not sold for a significant amount of time, or if it is otherwise desirable to quickly dispose of ("blow out") the product, a store typically sells the product to a consolidator or factory outlet at a fraction of the product cost. The expenses incurred in "blowing out" ("liquidating") a product include packaging, delivery and the loss to the seller for selling below cost. Accordingly, stores are averse to blowing out aging products, and instead prefer to sell aging products to customers.

In order to facilitate the sale of aging products without suffering the adverse effects of blowing out those products, stores often must lower the list prices (displayed prices) of those products to entice customers to purchase them. Unfortunately, lowering a list price of a product results in a lower profit, and possibly even a loss, on each sale of that product. Lowered prices may also make other, related products appear unduly expensive by comparison, thereby decreasing sales of those related products. Accordingly, it is desirable to sell aging products as quickly as possible. In addition, it would also be desirable to minimize or eliminate the publishing of lower list prices.

However, even lowering list prices does not move products until customers become aware of the lower prices. Customers may not become aware of the new prices until they visit the seller. Advertising new prices may increase customer awareness of new prices, but advertising is costly. Accordingly, lowering list prices does not allow a seller to accurately manage the timing and number of sales of aging products.

Lowering list prices can be even more costly to catalog merchants. A catalog merchant publishes catalogs of products and corresponding prices, and distributes the catalogs to potential customers. A catalog merchant typically prints several versions of each catalog in advance, each version having anticipated product prices during the course of a season or year. Each version is distributed at a different time, for example, a new catalog every month, in order to inform potential customers of the new prices. Accordingly, the catalog merchant often must establish prices well in advance of when those prices will become effective.

Because the different versions of the catalog are often printed well before the corresponding product prices are effective, the catalog merchant may have to reprint a new version if it is desirable to deviate from the pre-established prices. Such a deviation may arise in response to unanticipated conditions. For example, the catalog merchant may lower list prices of a product in response to a similar, unanticipated price reduction by a competitor. If the catalog merchant lowers list prices, it must either (i) incur substantial expenses reprinting and redistributing catalogs, or (ii) forego advertising the new, list prices, and thereby forego most of the benefits of lowering those prices. Accordingly, catalog merchants typically cannot respond easily to unanticipated conditions that affect product prices.

Some stores offer "tiered" prices, in which a series of subsequently lower prices for a product take effect over correspondingly subsequent periods of time. For example, a product price might be $100.00 during January (a first tier), $80.00 during February (a second tier) and $70.00 thereafter (a third tier). Tiered prices do not allow a seller to sell a product rapidly, for example, if there is a sudden need to clear old products to make space for new products. On the contrary, tiered prices tend to discourage customers from returning until the lowered prices are in effect. For example, customers willing to pay only the third tier price would not return until that price was in effect.

Tiered prices represent an attempt to predict demand for a product during different periods of time. However, like most conventional pricing schemes, tiered prices do not allow a seller to anticipate prices that customers are willing to pay until after the customers actually make purchases. Consequently, when a seller sets a tier price in order to sell the product quickly, the seller may inadvertently set the tier price too low, and make less profit than was attainable. Conversely, a seller may inadvertently set the tier price too high, and thus fail to move the product as quickly as desired.

In addition, tiered prices do not produce commitments to purchase products at any particular price or time. Customers may or may not return to visit the seller during the periods of future tiers. Thus, tiered prices do not allow a seller to accurately manage the timing or number of sales of products.

It is particularly difficult to coordinate the sale of aging products between a group of related stores, such as a chain of franchisees. One store may have difficulty selling a product, while another store has customers waiting to buy that same product. To the best of applicants' knowledge, no effective system exists for managing this disparity between supply and demand at related stores. Accordingly, aging products may not be sold to the waiting customers as rapidly as desirable, if at all.

It would be advantageous to provide methods and apparatus for managing the sale of aging products. Ideally, such methods and apparatus would allow stores to abate or overcome the above-described disadvantages.

SUMMARY OF THE INVENTION

An object of the present invention is to provide a method and apparatus for enabling a seller to more accurately manage the sale of aging products.

In accordance with the present invention, a store controller stores a series of prices for a product. Each price has a respective effective period during which that price is effective. A customer submits an offer to buy the product at an "offer price" that is one of the series of prices. The offer also has an offer period that elapses when the respective effective period of the product price elapses. The offer period thereby defines a period during which the offer is effective and after which the offer cannot be accepted.

Each offer further specifies (i) a customer identifier for identifying the customer, and (ii) funds or a payment identifier for specifying an account from which funds (typically the offer price) may be collected if the offer is accepted. The payment identifier is typically a credit card number, checking account number or other means for specifying funds. The payment identifier thus provides the seller with assurance that payment for the product will be available if the offer is accepted. Accordingly, the seller may more accurately make decisions on the sale of products.

The store controller operates to determine whether to accept the offer in accordance with operator-set criteria. Offers are effective and may be accepted at any time during the corresponding offer period, and particularly when it is desirable to move an aging product. For example, offers can be accepted if the corresponding product must be sold and the offer price is above a predetermined threshold. If the offer is accepted, the store controller (i) initiates the use of the payment identifier, if any, to collect the offer price, and (ii) uses the customer identifier to identify the customer as having paid for the product. Thus, the customer pays for the product and the seller must deliver the product or otherwise inform the customer that the product has been sold to him.

BRIEF DESCRIPTION OF THE DRAWINGS

FIG. 5 is a schematic illustration of an offer database of the store controller of FIG. 3.

FIG. 6 is a schematic illustration of an acceptance database of the store controller of FIG. 3.

FIG. 7 is a schematic illustration of an inventory database of the store controller of FIG. 3.

FIG. 8 is a schematic illustration of exemplary records of databases of the store controller of FIG. 3.

FIG. 17 is a schematic illustration of a store database of the central controller of FIG. 16.

DETAILED DESCRIPTION OF THE PREFERRED EMBODIMENTS

Figure 1:
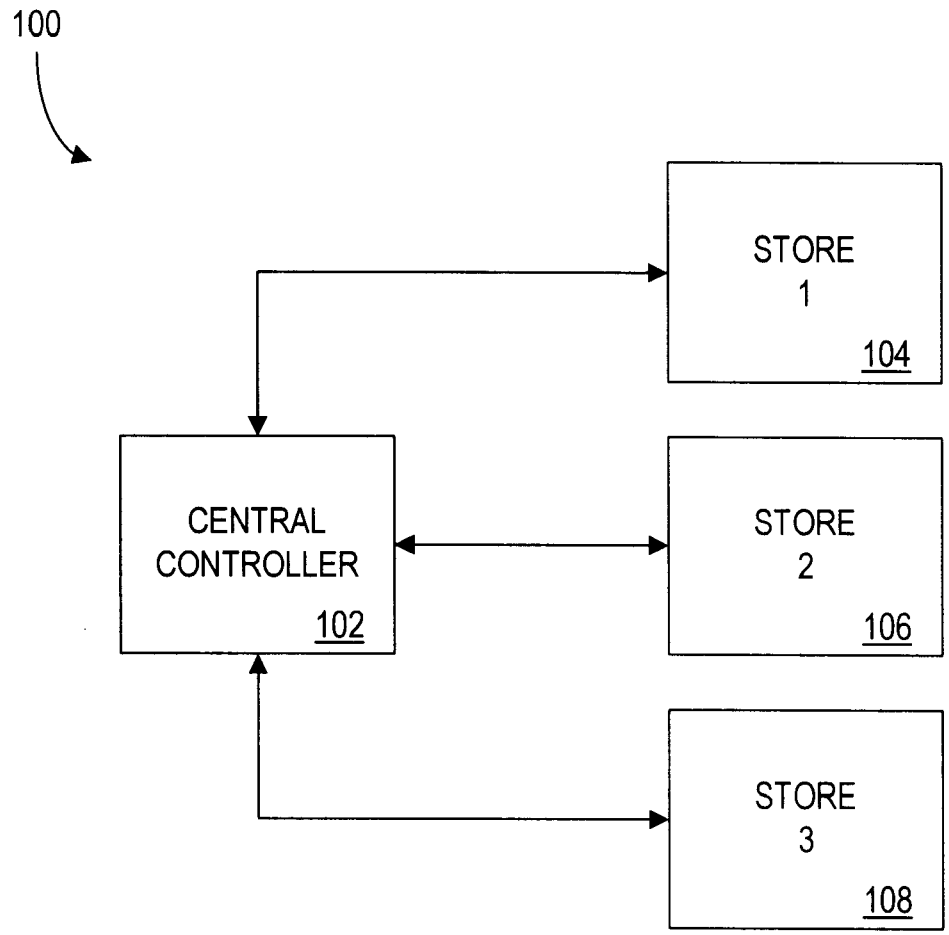
FIG. 1 is a schematic illustration of a system for managing the sale of aging inventory provided in accordance with the present invention.

For clarity, the following definitions apply:

The term "seller", as used herein, refers to an entity, such as a store, a chain of stores or a catalog merchandiser, that sells products to customers at prices that are set by the entity, not by a customer.

The term "product", as used herein, means any type of good or service that is offered for sale and/or sold by a seller.

The term "list price", as used herein, means a price that is set by the seller and displayed to customers, and which is therefore charged to customers who do not submit offers, but instead immediately purchase products.

In accordance with the present invention described herein, a store or other seller establishes, for each of a plurality of products, a series of subsequently decreasing prices and corresponding effective periods. The prices apply to offers that customers may submit for the products. The prices and periods are printed in a catalog or on a product tag, thereby informing potential customers of the series of prices.

A customer desiring to buy a product may either (i) pay list price and purchase the product immediately; or (ii) submit an offer at a (reduced) offer price selected from the series of prices. The customer provides the offer to a clerk operating a POS terminal. If an offer is submitted, it may be accepted, if at all, at any time before the corresponding effective period elapses.

Typically, each of the series of prices is lower than the list price of the product. Thus, if a customer is willing to wait to receive a product, or is willing to risk never having his offer accepted and thus never receiving the product, he pays a lower price than if he had paid list price to immediately purchase the product.

By requiring the customer to offer at a price selected from one of the series of seller-determined prices, rather than at an arbitrary price selected by the customer, the seller overcomes customer reluctance to select a reasonable offer price. Selecting one of a few seller-defined prices reasonably assures the customer that he has not inadvertently submitted an offer that is too low to ever be accepted or too high to be a "smart" offer.

By receiving and storing offers to purchase products, a seller can more precisely manage the sale of those products. Since the acceptance of offers is seller-driven, the seller may accept at any time desired. If a product is selling as quickly as desired at a list price set by the seller, the offers for that product need not be accepted, and the seller receives the profit accruing from the list price. On the other hand, if a product is not selling as quickly as desired, the seller may accept some or all stored offers for the product. Customers provide guaranteed commitments with their offers to buy the products, so the seller is assured that accepting an offer yields a guaranteed sale. Thus, the seller need not wait for customers to learn about a sale before products can be sold to customers at "sale prices".

Since the offers may be held confidential, the seller may continue selling the product at the list price, which is typically higher than the offer prices. Other customers will not easily determine what offer prices have been accepted, so the list price will not appear unduly high by comparison. Thus, many customers will still find the higher list price acceptable and pay that price.

In addition, due to the time factor of the tiered prices, customers are assured that their offer price will be accepted before lower offer prices are accepted. Thus, customers are assured that offering a relatively high offer price provides an advantage over customers that offer a lower offer price.

Furthermore, submitted offers allow the seller to determine prices that customers are willing to pay before the customers actually buy products. As a result, the seller can adjust a list price in dependence on a received offer. Thus, the seller can accurately manage the sale of aging products while avoiding the drawbacks associated with lowering prices.

Referring to FIG. 1, a system 100 for managing the sale of aging inventory comprises a central controller 102 connected to each of stores 104, 106 and 108. The stores 104, 106 and 108 are typically related stores, such as a chain of retail franchisees. Although three stores are shown in FIG. 1, it will be understood by those skilled in the art that the invention is applicable to one or more stores.

As described in detail below, the central controller 102 manages the sale of products in each of the stores 104, 106 and 108. In particular, the central controller 102 allows the stores 104, 106 and 108 to cooperate, and thus manage the sale of products more efficiently. However, in some embodiments of the present invention, a single seller operates alone, rather than together with a group of related sellers. In such an embodiment, the functionality of the central controller 102 may be embodied in an apparatus such as a store controller operated by a single seller. Accordingly, a single seller embodiment is first described below, followed by an embodiment with a plurality of sellers.

Figure 2:
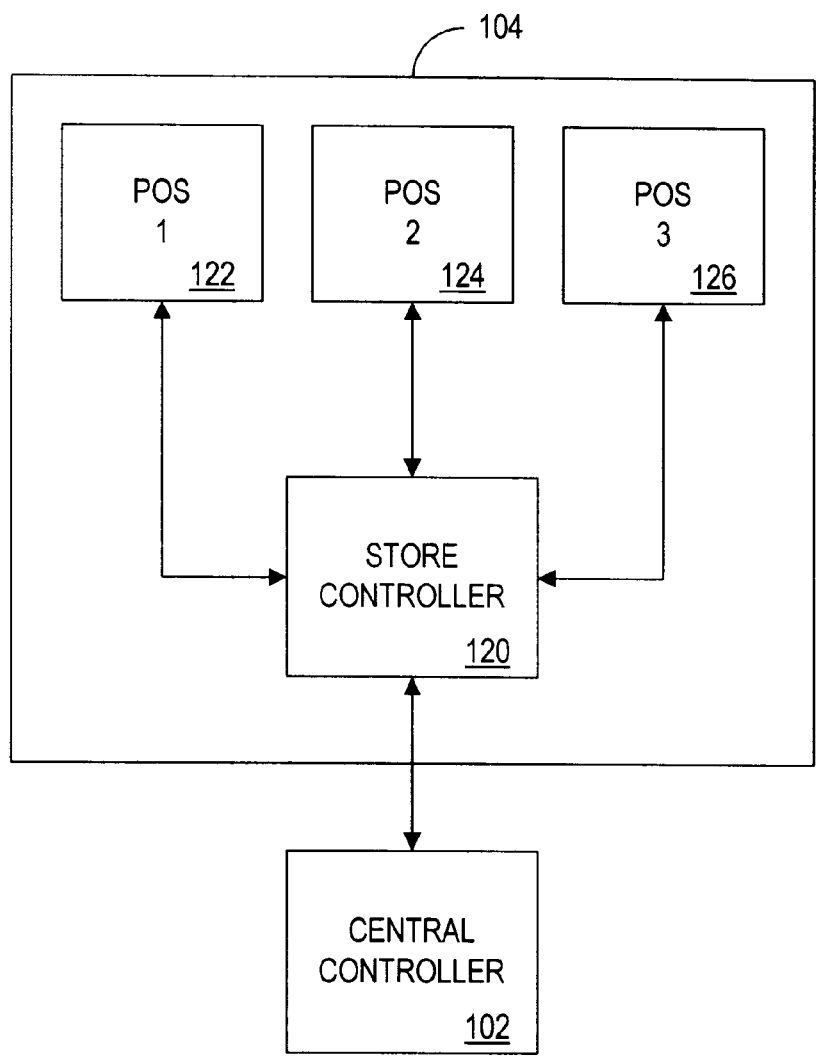
FIG. 2 is a schematic illustration of a store of the system of FIG. 1.

FIG. 2 depicts the store 104 in more detail. Stores 106 and 108 are similar to the store 104, and so a detailed illustration of each is omitted. The store 104 includes a store controller 120 connected to each of point-of-sale (POS) terminals 122, 124 and 126. The point-of-sale terminals 122, 124 and 126 are typically cash registers, desktop computers or similar devices at which offers may be entered, as described below. Any number of point-of-sale terminals may be connected to the store controller 120, although three are shown in FIG. 2 for purposes of illustration.

The store controller 120 is connected to the central controller 102. As described above, in certain embodiments, the functionality of the central controller 102 may be embodied in an apparatus within a single seller. Accordingly, the store controller 120 may also perform some or all of the functions of the central controller 102, rather than be connected to a separate central controller 102 as shown in FIG. 2.

Figure 3:
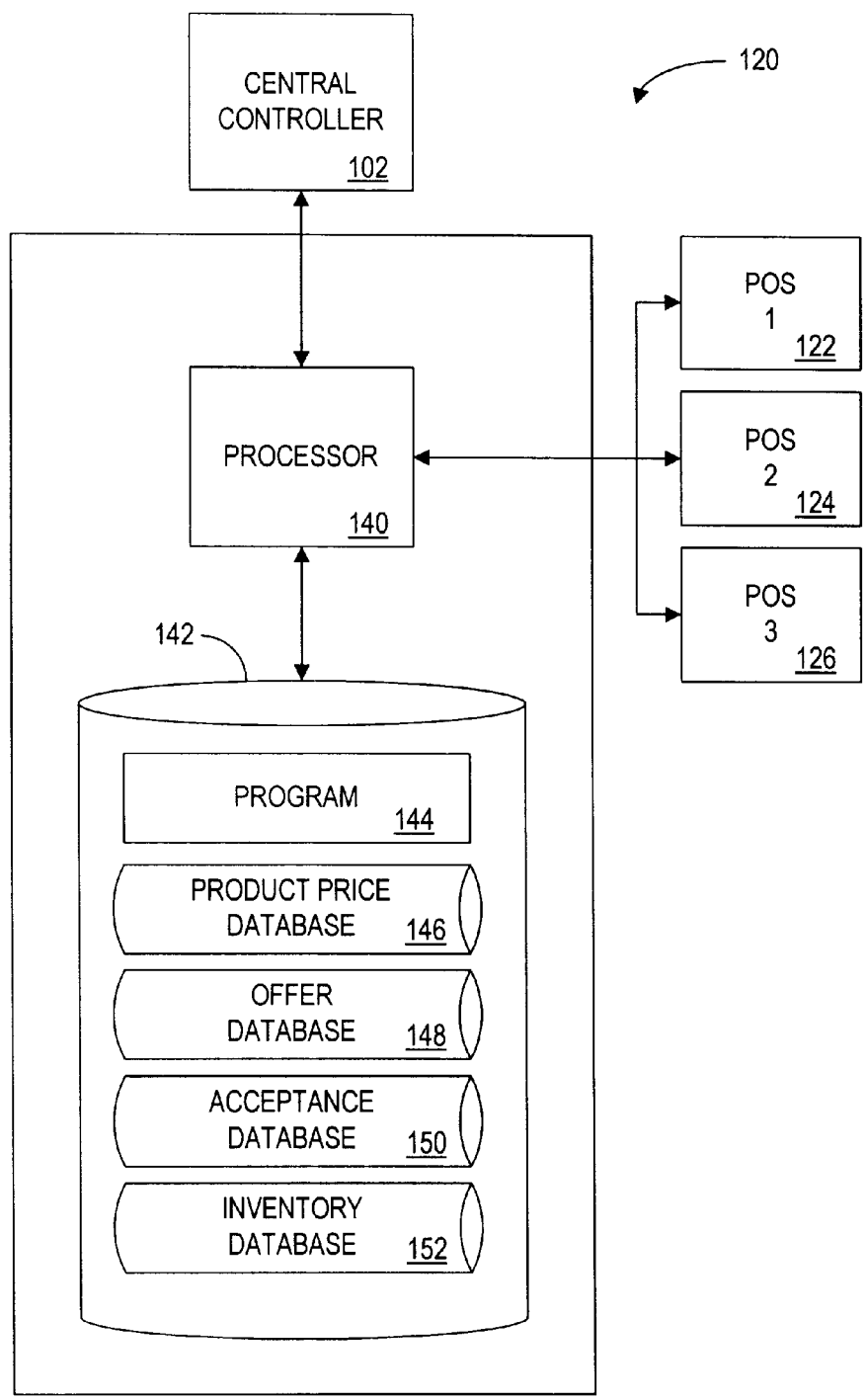
FIG. 3 is a schematic illustration of a store controller of the store of FIG. 2.

FIG. 3 depicts the store controller 120 in more detail. The store controller 120 comprises a processor 140, such as one or more conventional microprocessors, and a data storage device 142, such as a RAM, floppy disk, hard disk or combination thereof, which is connected thereto. The processor 140 is also connected to the central controller 102 and each of the point-of-sale terminals 122, 124 and 126.

The processor 140 and the storage device 142 may each be (i) located entirely within a single computer; (ii) connected to each other by a remote communication link, such as a serial port cable, telephone line or radio frequency transceiver; or (iii) a combination thereof. For example, the store controller 120 may comprise one or more computers connected to a remote server computer for maintaining databases.

The storage device 142 stores (i) a program 144 for controlling the processor 140 in accordance with the present invention, and particularly in accordance with the processes described in detail hereinafter; (ii) a product price database 146; (iii) an offer database 148 for storing offers from customers for products; (iv) an acceptance database 150 for storing accepted offers; and (v) an inventory database 152 for storing the quantity available of each product.

The program 144 includes program elements that may be necessary, such as "device drivers" for interfacing with computer peripheral devices. Appropriate device drivers and other necessary program elements are known to those skilled in the art, and need not be described in detail herein. Each of the databases 146, 148, 150 and 152 are described in detail below and depicted with exemplary entries in the accompanying figures. As will be understood by those skilled in the art, the schematic illustrations and accompanying descriptions of the databases presented herein are exemplary arrangements for the stored information. A number of other arrangements may be employed besides the tables shown.

Figure 4:
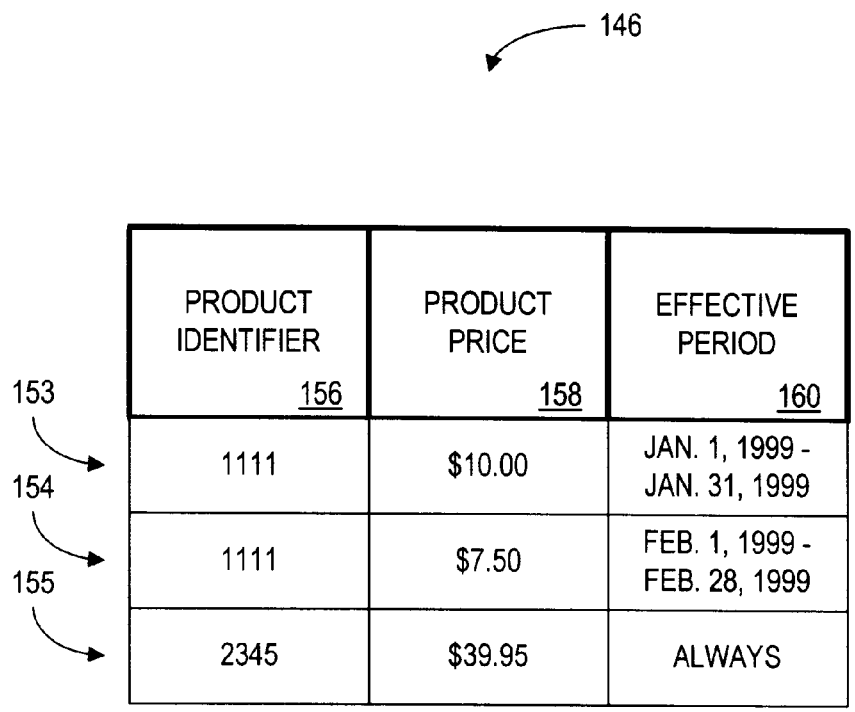
FIG. 4 is a schematic illustration of a product price database of the store controller of FIG. 3.

Referring to FIG. 4, the product price database 146 stores entries 153, 154 and 155, each having a product identifier 156 which uniquely indicates a product and a corresponding price 158 of the product. The prices stored in the product price database 146 are not list prices, but are instead prices set by the seller for customers who submit offers. In other words, in lieu of a purchase at list price, a customer may instead choose to submit an offer to purchase a product at an offer price selected from a series of seller-defined prices. Accordingly, in the embodiment illustrated in FIG. 4, each entry defines a product and a price at which customers may submit an offer for the product. Typically, each product has a series of tiered prices, and consequently two or more entries in the product price database 146 may have identical product identifiers.

The product price database 146 also stores, for each price, a respective effective period 160 during which that price is effective. The effective period is typically a day, range of days or set of days. However, some products can have an effective period that is always in effect after a predetermined date, so the product always has one price after that date. The effective periods are typically sorted such that each effective period increases in comparison to the previous effective period. In addition, since the price of a product typically decreases with time, each of the series of prices decreases in comparison to the previous price as the effective periods increase in comparison to each previous effective period.

Those skilled in the art will understand that a number of other arrangements may be employed for the product price database 146 besides the table shown in FIG. 4. For example, in other embodiments, each entry in the product price database 146 may include a product identifier and several prices and effective periods.

Referring to FIG. 5, the offer database 148 stores entries 170 and 172, each having an offer identifier 173 for uniquely identifying each offer, a product identifier 174 which indicates a product, and a corresponding offer price 176 for the product. Accordingly, each entry defines an offer to purchase a product at an offer price. The offer price is selected from the series of prices of the product stored in the product price database 146.

The offer database 148 also stores, for each entry, a customer identifier 178 that indicates a customer who submitted the offer for the product. A payment identifier 180 may also be stored in the offer database 148, thereby specifying an account from which the offer price or other amount of funds may be collected. The specified account typically is a credit card, debit card, savings account or checking account from which funds are transferred if the seller accepts the offer.

As described above, an offer price has an offer period during which the offer is effective and may be accepted.

After the offer period has elapsed, the offer may not be accepted. For example, an offer at the first tier price remains effective until the first tier period has elapsed. Thus, the customer is assured that his (typically higher) offer price will expire after other (typically lower) offer prices are entertained. An offer period 181 indicates a period during which the offer is effective, and may be either (i) a period which elapses when the effective period of the selected price elapses; or (ii) a customer-selected period which elapses sooner than the effective period of the selected price.

Referring to FIG. 6, the acceptance database 150 stores entries 190, 192 and 194, each having an acceptance identifier 196 for uniquely identifying the entry, an offer identifier 198 which indicates an offer from the offer database 148 (FIG. 5) that has been accepted, and the date 200 of acceptance. Based on the offer identifier 198, information that corresponds to the offer may be determined from the offer database 148. For example, based on the offer identifier 198, the corresponding product identifier 174 (FIG. 5) and offer price 176 (FIG. 5) may be determined from the offer database 148. In other embodiments, corresponding information may be also stored in the acceptance database 150, as well as in the offer database 148.

Referring to FIG. 7, the inventory database 152 stores entries 202 and 204, each having a product identifier 206 which indicates a product and a quantity 208 of each product. Accordingly, each entry defines how many items of each product are available for purchase. The product identifier 206 may be compared with product identifiers in the offer database 148 (FIG. 5), thereby matching entries in the inventory database 152 with entries in the offer database 148 (FIG. 5). Thus, for each offer in the offer database 148, the quantity available may be determined from the inventory database 152.

FIG. 8 illustrates exemplary records used in the acceptance of an offer for a product. A product price database 210, which is an embodiment of the product price database 146 of FIG. 4, stores two prices and effective periods for a product identified by product identifier "1111". An offer database 220, which is an embodiment of the offer database 148 of FIG. 5, stores an offer for the product "1111" for an offer price of $7.50. The offer was submitted by, or on behalf of, a customer identified by "AVL204", and a payment identifier specifies a credit card account number to pay for the product if the offer is accepted.

An inventory database 230, which is an embodiment of the inventory database 152 of FIG. 7, stores the quantity of the product "1111". As seen in FIG. 8, there are seventeen units of product "1111" available.

An acceptance database 240, which is an embodiment of the acceptance database 150 of FIG. 6, stores an entry indicating an acceptance of the offer "1", and thereby indicates that the customer "AVL204" has purchased the product "1111". Accordingly, use of the payment identifier is initiated to collect the $7.50 from the credit card account, and the product is delivered to the customer or set aside for the customer.

Figure 9:
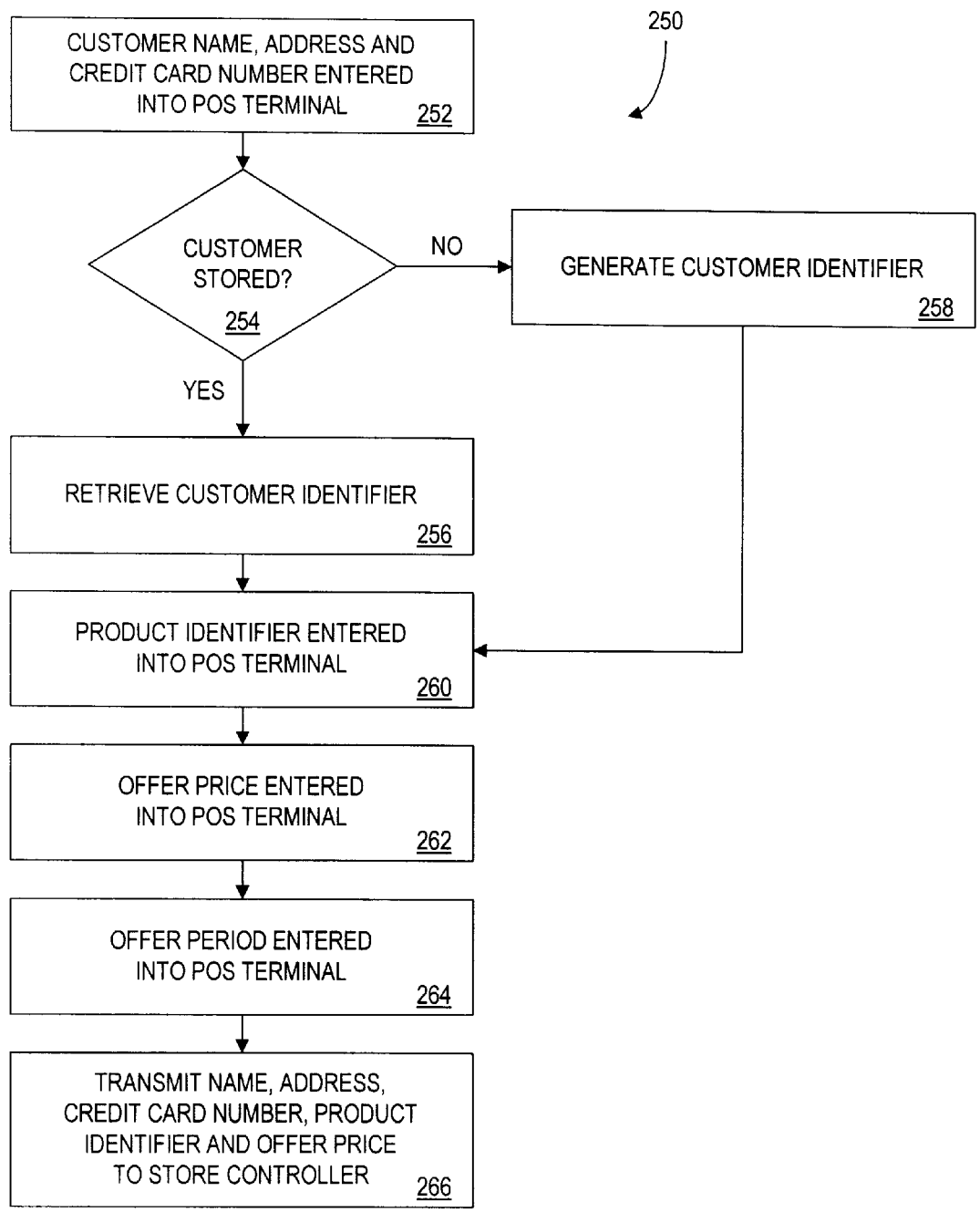
FIG. 9 is a flowchart depicting a method for submitting an offer for a product.

Referring now to FIG. 9, a method 250 illustrates the steps taken when a customer submits an offer for a product, and the offer is entered into a POS terminal. Such a POS terminal may be a cash register at a retail store, or a desktop computer operated by a customer service representative of a catalog merchant. The customer name, address and credit card number are entered into the POS terminal (step 252). If the customer has previously submitted an offer and a corresponding customer identifier established (step 254), then that customer identifier is retrieved (step 256). If a customer identifier does not already exist, then a new, unique customer identifier is generated (step 258) to identify the customer.

A product identifier for a desired product is entered into the POS terminal (step 260), and an offer price is also entered into the POS terminal (step 262). As described above, the offer price is selected from a series of prices for the product. Typically, the customer obtains the product identifier and product price(s) from a catalog or a product tag bearing a product number and product price(s), and provides the same to a clerk operating the POS terminal.

The offer has an associated offer period during which the offer is effective and after which the offer cannot be accepted. As described above, the offer period elapses when the effective period of the selected price elapses. In addition, the customer may specify that the offer period elapse even sooner than the effective period of the price. For example, although a selected price may be effective until the end of June, the customer may specify that the offer is effective until the beginning of June. Any customer-specified offer period is entered into the POS terminal (step 264).

The above-described information that is entered into the POS terminal is then transmitted to the store controller 120 (FIG. 2) for storage (step 266). After transmission, the offer is stored and may be accepted when the seller desires if the offer remains effective. Described below are several embodiments of a method for managing stored offers for products, each provided in accordance with the present invention.

Figure 10:
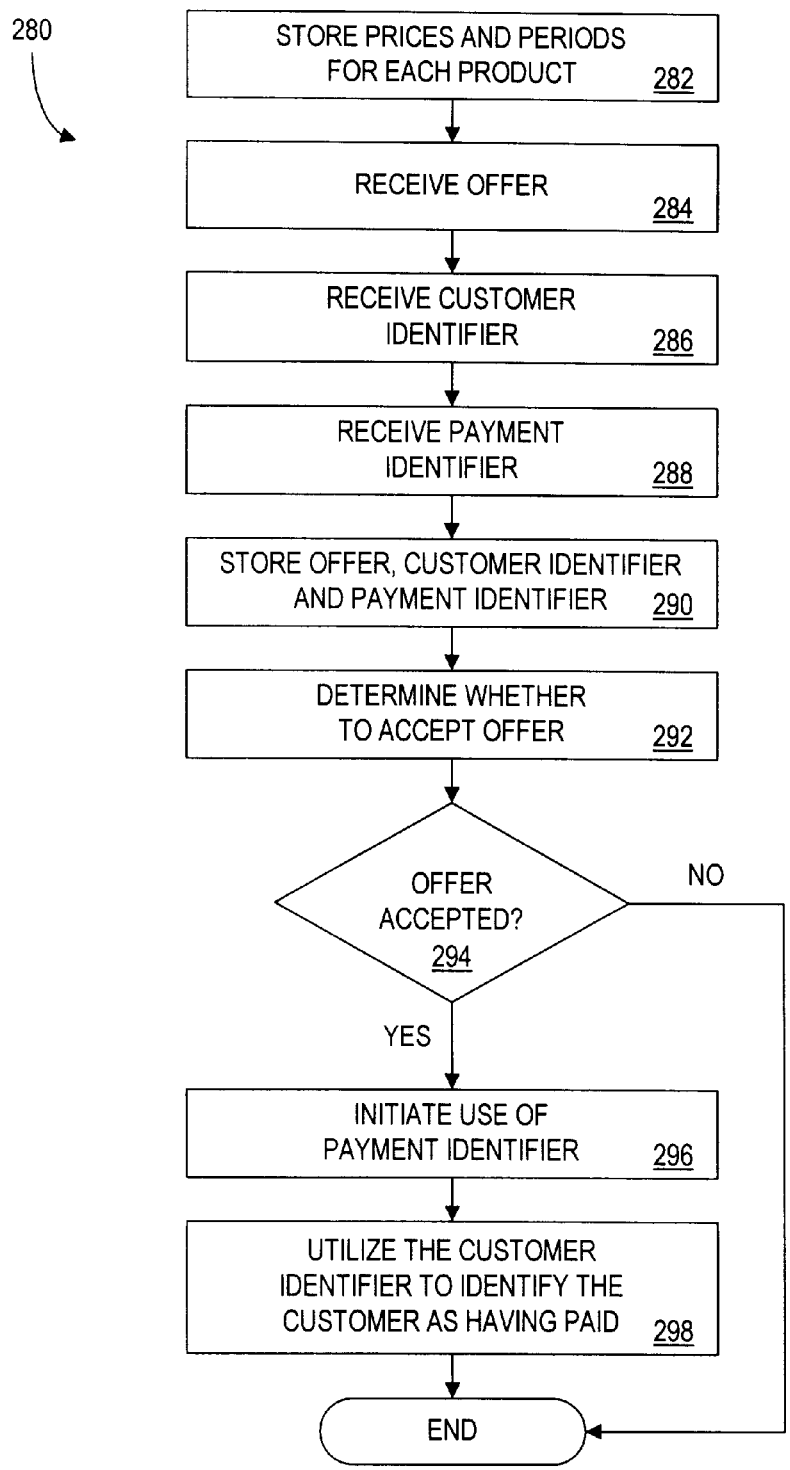
FIG. 10 is a flowchart depicting an embodiment of a method for managing stored offers for products.

Referring to FIG. 10, a method 280 illustrates steps performed by the store controller 120 (FIG. 2) in managing and accepting the stored offers for products. The method 280 may alternatively be performed by the central controller 102 (FIG. 1) in an embodiment with more than one seller. Prices and corresponding effective periods for each of a plurality of products are stored (step 282). Such prices and periods may be entered and changed as needed. For example, when new products are introduced or old products are discontinued, corresponding prices and effective periods for each product can be entered or deleted, respectively.

The offer, customer identifier and payment identifier are each received from the POS terminal (steps 284, 286 and 288). Still more information, such as the customer name and address, may be received from the POS terminal as well. Each of the offer, customer identifier and payment identifier may also be verified after being received. For example, the payment identifier may be verified by determining that an amount of funds are available, or attempting to "freeze" (make unavailable to the customer) an amount of funds in an account, as assurance that such funds remain available to the seller if the stored offer is accepted. The offer, customer identifier and payment identifier are then stored (step 290), and may be retrieved for subsequent evaluation, review and/or acceptance of the offer.

As described below, any of a number of methods may be used in determining whether to accept the offer (step 292). If any offer is accepted (step 294), then use of the corresponding payment identifier is initiated in order to collect the offer price (step 296). Typically, the payment identifier is a credit card number, so initiating use of the credit card number can comprise charging the offer price to the credit card number. In addition, the corresponding customer identifier is utilized to identify the customer as having paid for the product (step 298). For example, an entry in a "product delivery database" may be made to initiate delivery of the product to the customer, or a receipt may be printed out bearing the name of the customer and the product bought.

Figure 11:
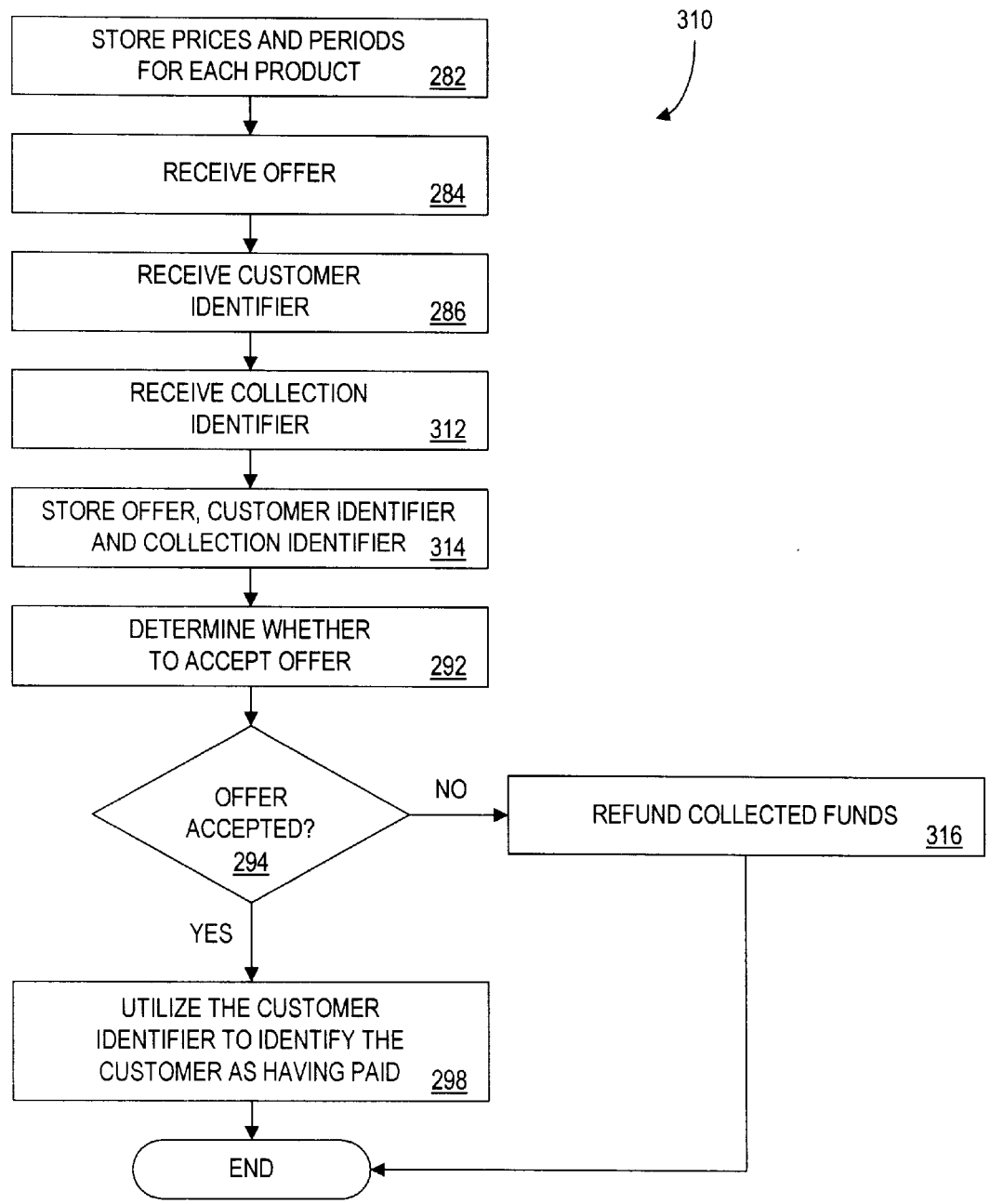
FIG. 11 is a flowchart depicting another embodiment of a method for managing stored offers for products.

Referring to FIG. 11, a method 310 is another embodiment of a method for managing stored offers for products.

The method 310 is similar to the method 280 (FIG. 10) described above, and like steps are numbered with like figure numerals in FIGS. 10 and 11. The method 310 differs from the method 280 (FIG. 10) in that a collection identifier is received from the POS terminal (step 312), rather than a payment identifier (step 288 of FIG. 10). The collection identifier specifies an amount of collected funds, and may be, for example, an entry indicating an amount of cash tendered at the POS terminal or an amount of funds authorized and tendered from a credit card account. The received collection identifier is also stored (step 314). Thus, in the present embodiment a customer submits an actual payment before the offer is accepted by the seller, rather than an account number used to effect a payment after acceptance of the offer by the seller.

If an offer is not accepted (step 294) by the seller, then the corresponding collected funds are refunded (step 316). Such a refund may be accomplished in any of several ways. For example, a voucher may be printed and delivered to the customer, a credit card account may be credited or an entry may be entered in a database for indicating an amount of store credit due to the customer.

Figure 12A:
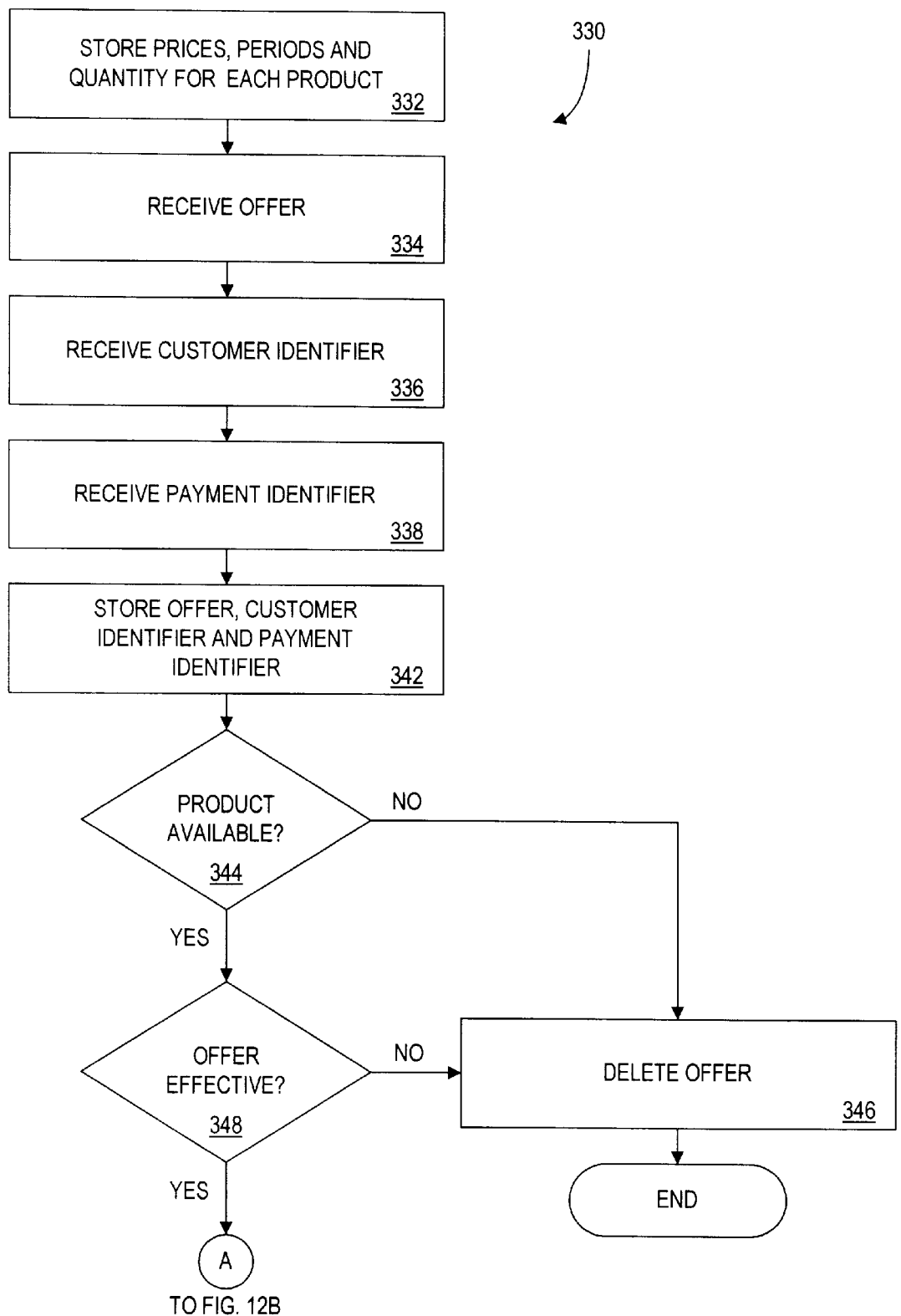
FIGS. 12A and 12B are flowchart s depicting yet another embodiment of a method for managing stored offers for products.
Figure 12B:
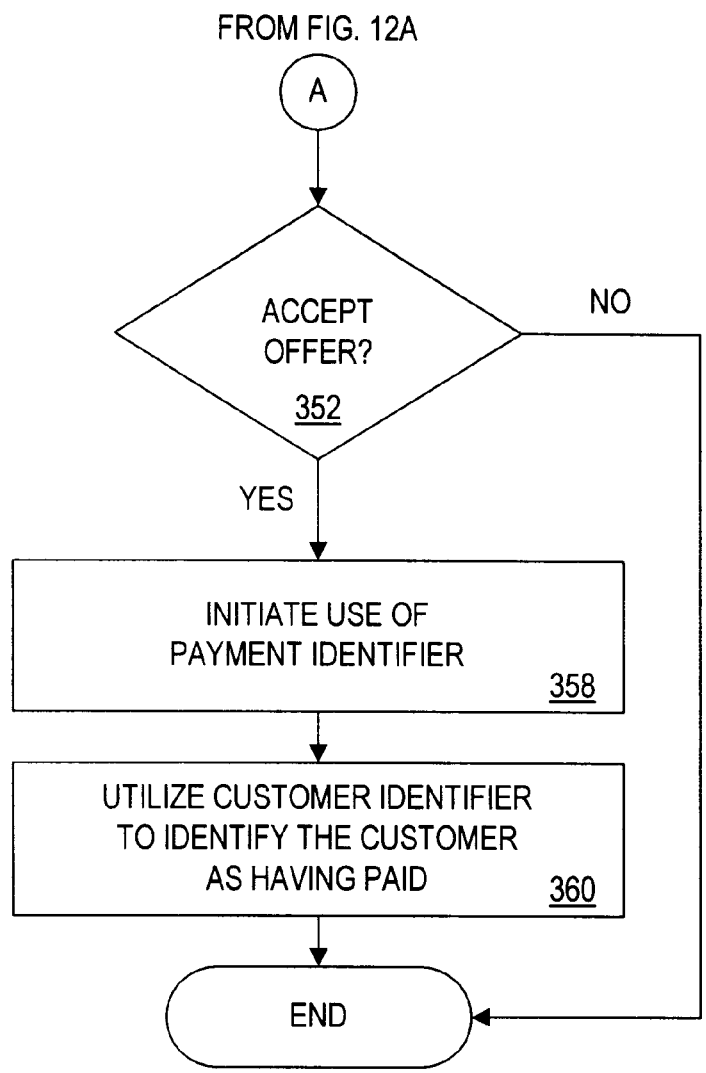

FIGS. 12A and 12B depict a method 330 of yet another embodiment for managing stored offers for products which is similar to the method 280 (FIG. 10) described above. The method 330 includes yet further steps that may be desirable in managing offers, and particularly in managing when to accept and/or delete (clear or make unacceptable) offers.

Prices, corresponding effective periods and the quantity for each of a plurality of products are stored (step 332). An offer for a product, a customer identifier and a payment identifier are each received from the POS terminal (steps 334, 336 and 338 respectively) and stored (step 342).

After the offer is stored, it is determined if the product is available (step 344). If the product is not available, the offer is deleted (step 346) since the offer cannot be accepted. The availability of each product is determined from an associated inventory entry indicating a quantity available. Typically, the product is deemed to be "available" if the quantity is greater than zero. Alternatively, it may be desirable to sell the product only if more than a predetermined amount of the product is available. In such an embodiment, a quantity greater than a predetermined amount would indicate that the product is available.

The offer period is evaluated in order to determine if the offer is still effective (step 348). Such an evaluation may comprise, for example, determining if the current date is within the offer period, or determining if the offer period is about to expire. If the offer is not effective, the offer is deleted (step 346) since it cannot be accepted.

However, if the offer is effective, then the offer is evaluated to see if it is desirable to accept the offer (step 352). Such an evaluation may comprise, for example, accepting all offers for a product, or accepting the highest offer price. If the offer is accepted, use of the payment identifier is initiated to collect payment for the product (step 358). In addition, the customer identifier is utilized to identify the customer as having paid (step 360).

In some embodiments, the seller may cancel an accepted offer, and refund any funds, if any, which were collected in connection therewith.

The above described embodiments of a method for managing stored offers for products illustrate, among other things, steps performed before and after an offer is accepted. The description that follows explains methods for determining whether to accept an offer.

Figure 13:
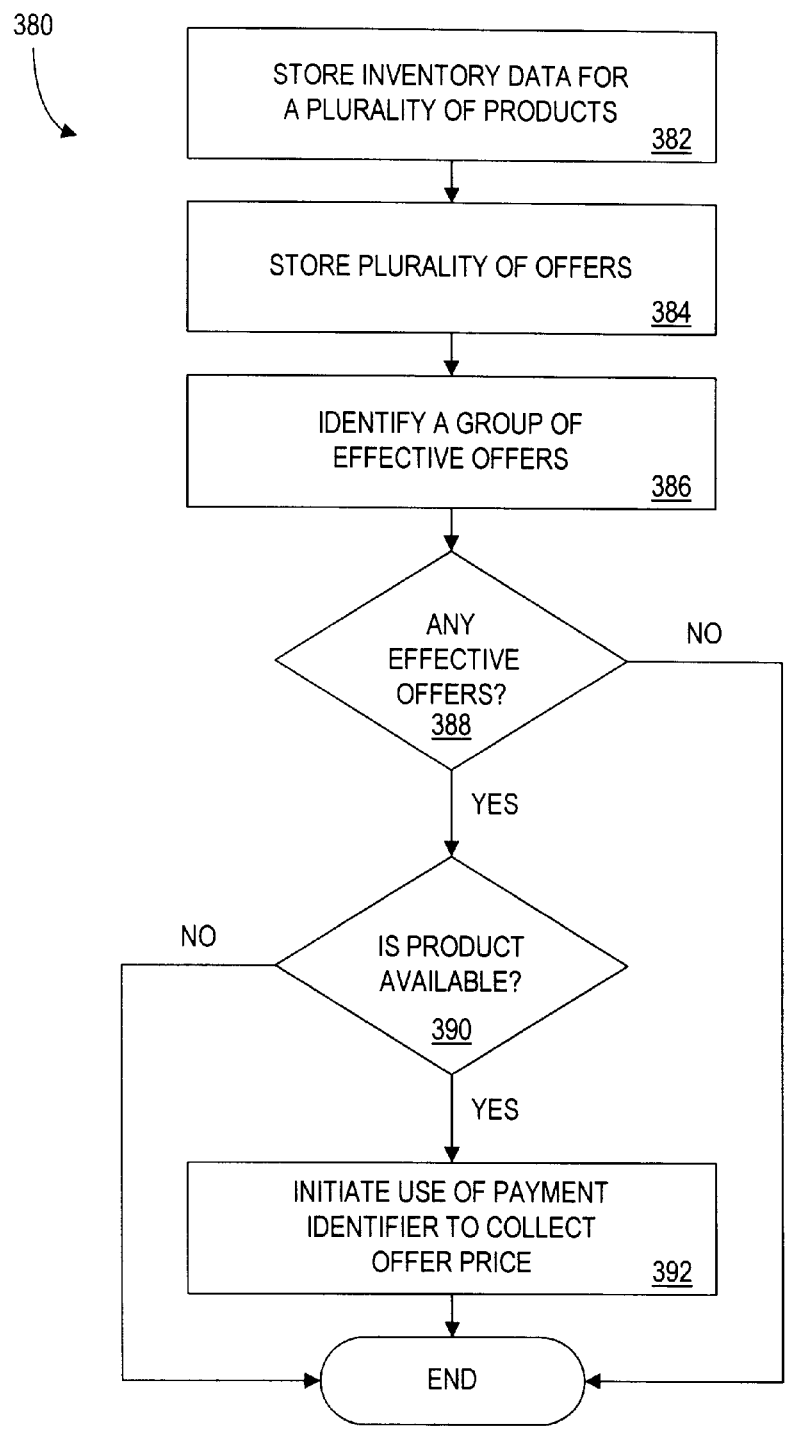
FIG. 13 is a flowchart depicting a method for determining whether to accept an offer for a product.

Referring now to FIG. 13, a method 380 comprises steps for determining to accept offers for a selected product, based on whether there are effective offers for the selected product. The method 380 is especially advantageous when there are one or more particular products which must be moved. Inventory data is stored for each of a plurality of products (step 382), thereby indicating a quantity available of each product. In addition, a plurality of offers is stored (step 384).

A group of effective offers is identified (step 386). The offers may also be compared with a predetermined date, such as "July 1", in order to identify offers which are effective only before the predetermined date. Thus, offers that cannot be accepted after July 1 (expiring offers) may be determined.

If there are any effective offers (step 388), and if the desired products are available (step 390) then use of the corresponding payment identifiers are initiated to collect the offer prices from the customers (step 392), and the products are delivered to the customers.

In single-seller embodiments, whether a product is available may be determined from an inventory database storing a quantity available of the product. In an embodiment with more than one seller, a product can be deemed available if any of the sellers have the product available. In such an embodiment, the inventory databases of each seller are accessed in order to find a seller having a product quantity that is greater than zero. As appropriate, products can be shipped between multiple participating sellers.

Figure 14:
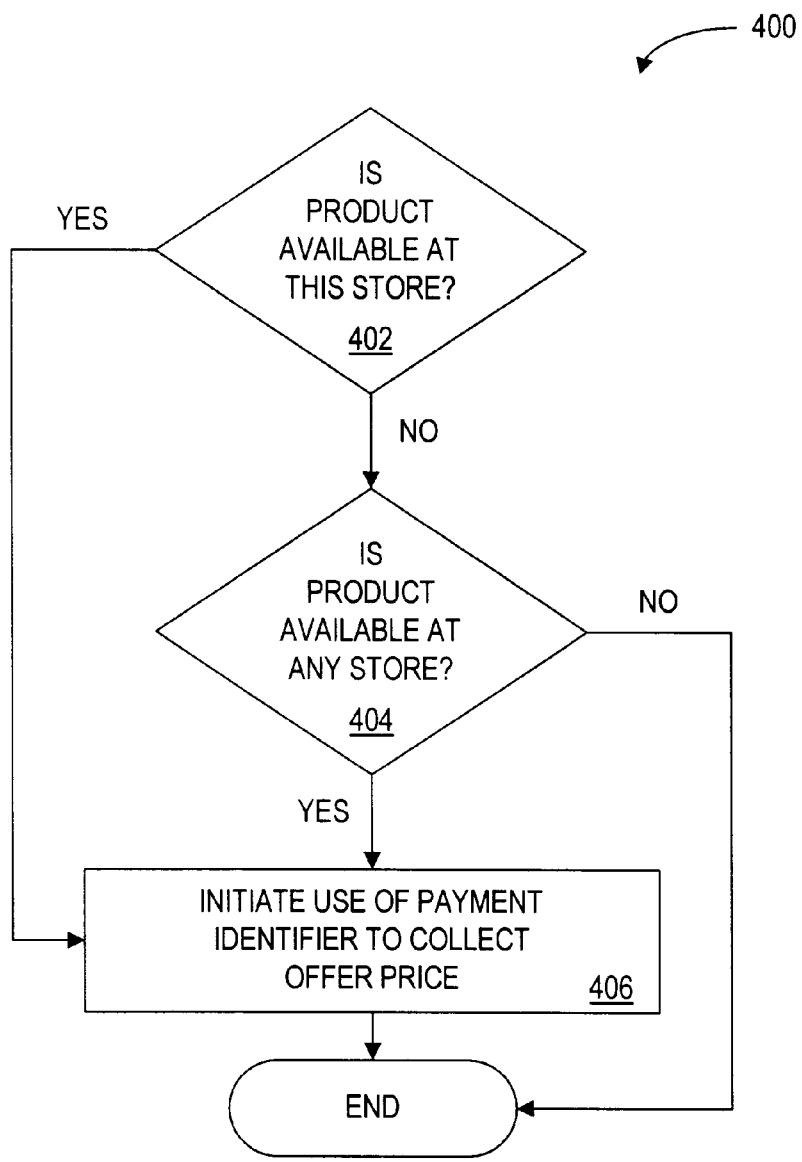
FIG. 14 is a flowchart depicting a method for determining if a product is available.

FIG. 14 illustrates in simplified form a method 400 for determining if a product is available in a multiple-seller embodiment. If a selected product is not available at a first store (step 402), then it is also determined if the selected product is available at any other related stores (step 404). If any store does have the product available, then the offer is accepted, use of the payment identifier is initiated (step 406) and the product is shipped to the customer or to a store selected by the customer.

Figure 15:
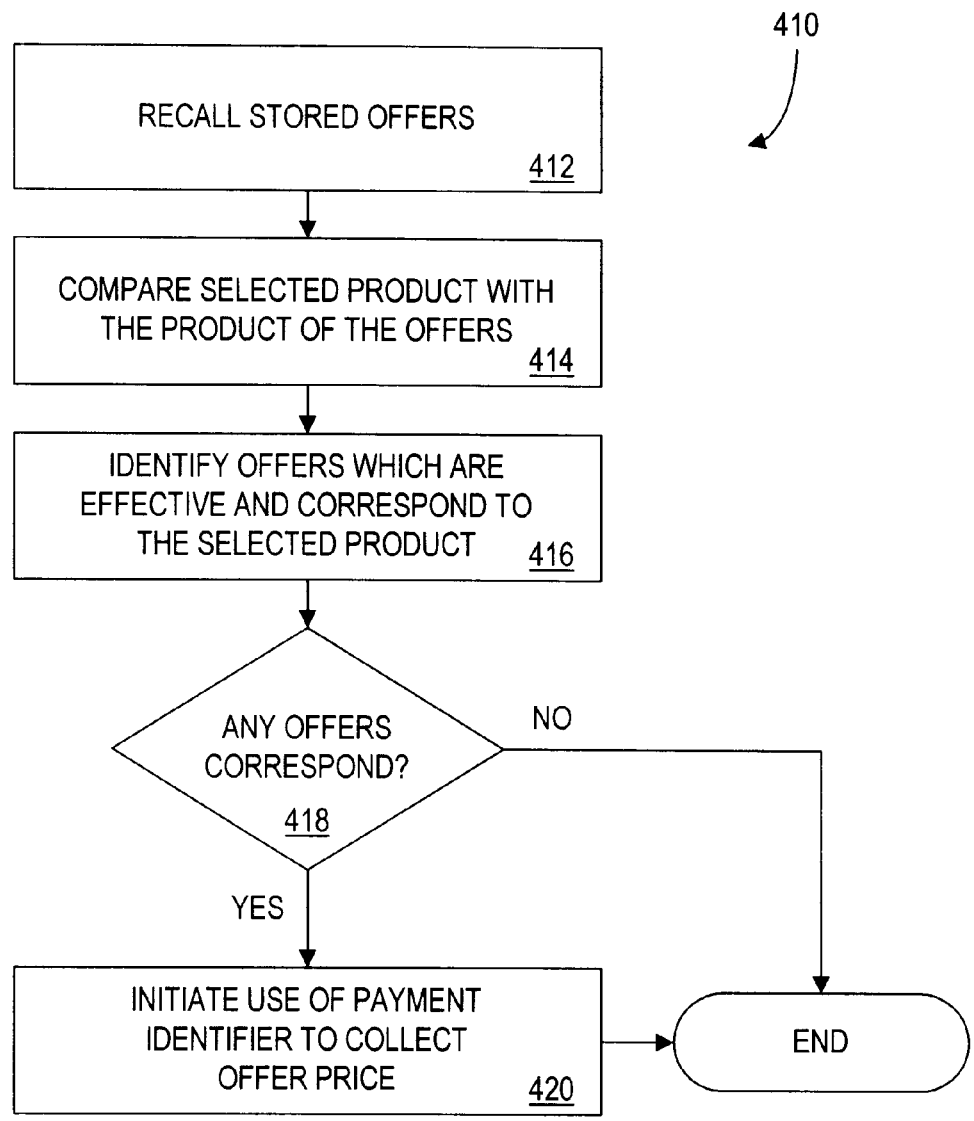
FIG. 15 is a flowchart depicting a method for determining whether to accept offers.

It may be desirable to sell a selected product at any reasonable price, especially if it is necessary to rapidly move the selected product. FIG. 15 illustrates a method 410 for determining whether to accept offers based on a selected product to move. A plurality of stored offers are recalled (step 412), and the product identifier of each offer is compared to the selected product identifier (step 414) to identify offers for the selected product. Offers that correspond to the selected product are identified (step 416). If one or more offers correspond to the selected product (step 418), use of the corresponding payment identifier is initiated to collect the offer price (step 420).

A variety of other criteria may be used in determining whether it is desirable to accept an offer. Criteria described above include accepting (i) all expiring offers; (ii) all offers for a selected product; (iii) all offers for available products; and (iv) a combination thereof. In other embodiments, it may be desirable to accept an offer for a selected product if (i) the quantity available of the product is greater than a predetermined threshold; (ii) the number of offers for the product is greater than a predetermined threshold; (iii) the average offer price for the product is greater than a predetermined threshold; (iv) the number of "reasonable" offers for the product is greater than a predetermined threshold; (v) sales of the product are less than a predetermined threshold; or (vi) a combination thereof.

As described above, the central controller 102 (FIG. 1) allows a plurality of sellers to cooperate, and thus to manage the sale of products more effectively. In particular, the central controller 102 aggregates each of the inventory databases of the sellers and aggregates the offer databases of the sellers. Thus, the central controller 102 can determine (i)

which products are available from each of the sellers (supply of products); and (ii) which offers have been submitted to each of the sellers (demand for products). The offers of a store can be matched with products of other stores, and a customer offer can be satisfied from any store having the desired product. Thus, each participating store may sell more products and satisfy more customer demand than any store could have done alone. In summary, the particular store of a chain of stores that a customer visits is immaterial in meeting customer demand.

Figure 16:
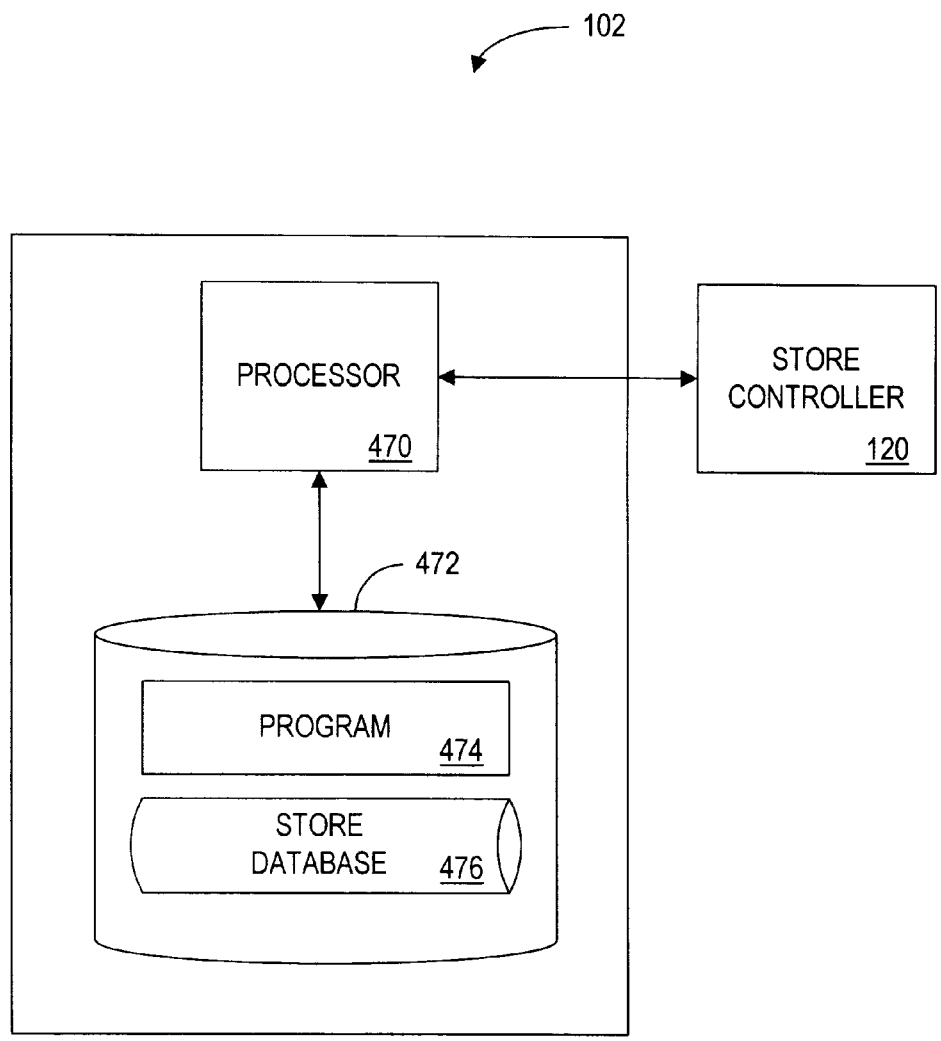
FIG. 16 is a schematic illustration of the central controller of FIG. 1.

FIG. 16 depicts the central controller 102 of FIG. 1 in more detail. The central controller 102 comprises a processor 470, such as one or more conventional microprocessors, and a data storage device 472, such as a RAM, floppy disk, hard disk or combination thereof, which is connected thereto. The processor 470 is also connected to the store controller 120 (FIG. 2). As described above, any number of stores, and thus store controllers, may be connected to the central controller 102 although only one is depicted in FIG. 16.

The processor 470 and the storage device 472 may each be (i) located entirely within a single computer; (ii) connected thereto by a remote communication link, such as a serial port cable, telephone line or radio frequency transceiver; or (iii) a combination thereof. For example, the central controller 102 may comprise one or more computers connected to a remote server computer for maintaining databases.

The storage device 472 stores (i) a program 474 for controlling the processor 470 in accordance with the present invention, and particularly in accordance with the processes described in detail hereinafter; and (ii) a store database 476 for storing information on each store that is connected to the central controller 102.

The program 474 also includes program elements that may be necessary, such as "device drivers" for interfacing with computer peripheral devices. Appropriate device drivers and other necessary program elements are known to those skilled in the art, and need not be described in detail herein.

Referring to FIG. 17, the store database 476 stores entries 480 and 482, each having (i) a store identifier 484 for uniquely identifying a store connected to the central controller 102 (FIG. 16); (ii) an address 486 of the store; and (iii) a network address 488 for specifying a network address of the corresponding store controller, thereby allowing the central controller 102 to communicate with the corresponding store.

Figure 18:
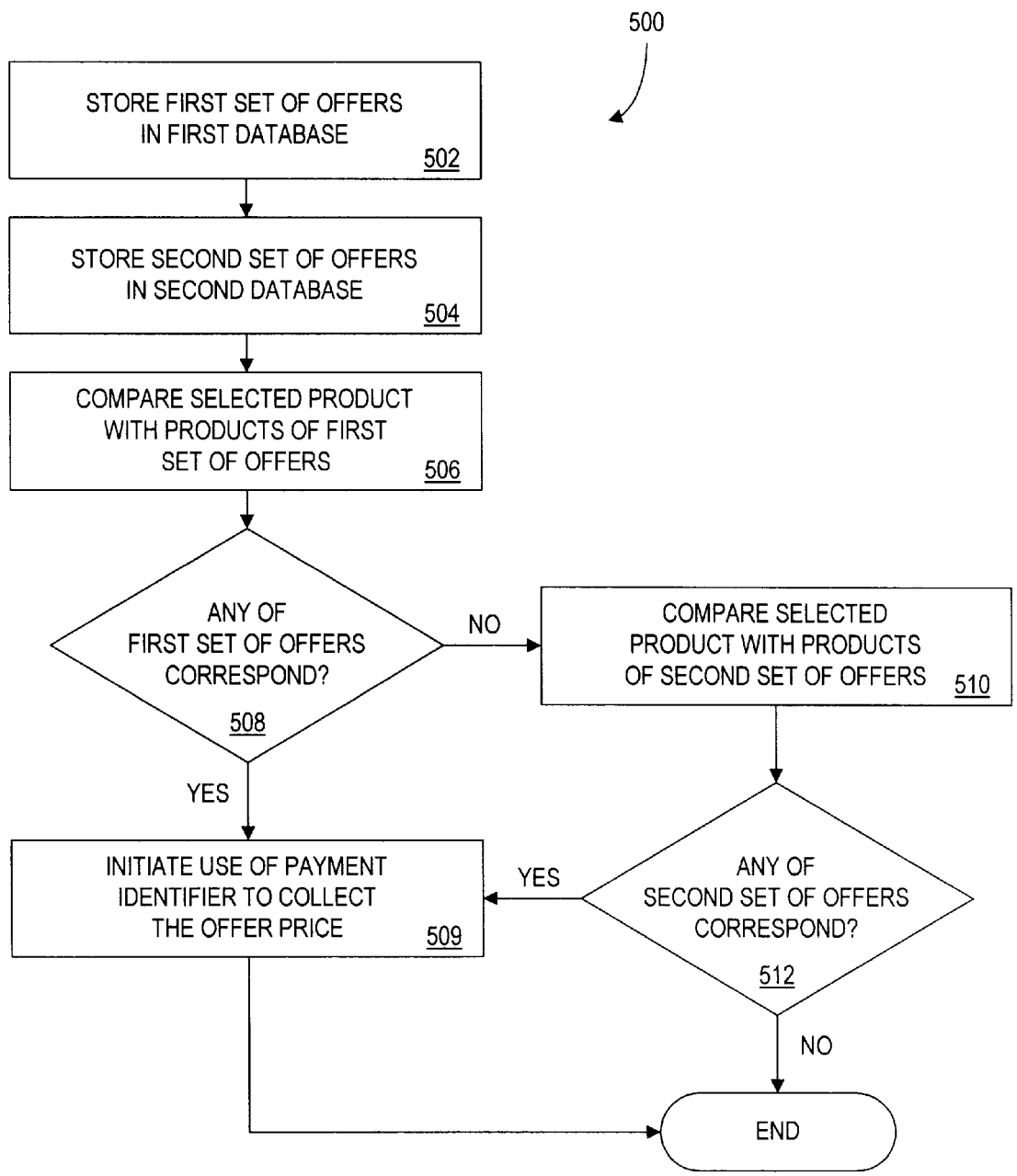
FIG. 18 is a flowchart depicting a method for aggregating the offer databases of two or more sellers.

FIG. 18 illustrates a method 500 for aggregating the offer databases of two or more sellers, thereby permitting offers separately submitted to multiple stores to be compared and evaluated. A first set of offers submitted to a first seller is stored in a first offer database (step 502), and a second set of offers submitted to a second seller is stored in a second offer database (step 504). The offer databases may be stored on the respective store controllers, or may be stored on the central controller 102 (FIG. 16).

A selected product to move is compared with the products of the first set of offers (step 506). The first set of offers is typically the offers submitted at the store desiring to move the product. Thus, "local" offers are compared and evaluated before the offers of other stores. If any offers in the first set of offers correspond to the selected product (step 508), then use of the corresponding payment identifier is initiated in order to collect the offer price (step 509).

If no offers in the first set of offers correspond to the selected product, then the selected product is compared with the products of the second set of offers (step 510). If any offers in the second set of offers correspond to the selected product (step 512), then use of the corresponding payment identifier is initiated in order to collect the offer price (step 509). It will be understood that any of the evaluation criteria described above can be used to manage the offer acceptance process amongst multiple sellers.

Although the present invention has been described with respect to a preferred embodiment thereof, those skilled in the art will understand that various substitutions may be made to those embodiments described herein without departing from the spirit and scope of the present invention. For instance, rather than initiating use of a payment identifier such as a credit card number to collect funds when an offer is accepted, the store controller may instead provide a phone number of the customer so that the customer may be called and informed that his offer has been accepted. In addition, although the customer typically may select from a series of seller-defined product prices, in other embodiments the customer may select his own offer price.

We claim:

1. A method for managing the sale of a product, comprising:

generating a customer identifier for identifying a customer;

selecting a price from a series of prices;

generating an offer for the product, the offer including an offer price which is the selected price;

generating a payment identifier for specifying an account from which funds may be collected; and transmitting the customer identifier, the offer and the payment identifier to a controller for storage, wherein the stored offer further includes an offer period during which the offer is effective.

2. An apparatus for managing the sale of a product, comprising:

a storage device; and a processor connected to the storage device, the storage device storing a program for controlling the processor;

the processor operative with the program to generate a customer identifier for identifying a customer;

select a price from a series of prices;

generate an offer for the product, the offer including an offer price which is the selected price;

generate a payment identifier for specifying an account from which funds may be collected;

transmit the customer identifier, the offer and the payment identifier to a controller for storage; and wherein the stored offer further includes an offer period during which the offer is effective.

3. A method for selling a product, comprising:

advertising a series of special prices for the product, each of the special prices having an effective time period associated therewith;

receiving at least one offer for the product, the offer identifying one of the series of special prices and the corresponding effective time period;

continuing to sell the product at a list price while performing the receiving step, thereby establishing a source of alternate demand for the product;

periodically reviewing the at least one offer to determine whether to accept the at least one offer; and storing an indication of whether the product is available.

4. A method for selling a product, comprising:

advertising a series of special prices for the product, each of the special prices having an effective time period associated therewith;

receiving at least one offer for the product, the offer identifying one of the series of special prices and the corresponding effective time period;

continuing to sell the product at a list price while performing the receiving step, thereby establishing a source of alternate demand for the product; and periodically reviewing the at least one offer to determine whether to accept the at least one offer in which the step of reviewing is performed only if the product is available.

5. A method for selling a product, comprising:

advertising a series of special prices for the product, each of the special prices having an effective time period associated therewith;

receiving at least one offer for the product, the offer identifying one of the series of special prices and the corresponding effective time period;

continuing to sell the product at a list price while performing the receiving step, thereby establishing a source of alternate demand for the product;

periodically reviewing the at least one offer to determine whether to accept the at least one offer; and storing the at least one offer.

6. A method for selling a product, comprising:

advertising a series of special prices for the product, each of the special prices having an effective time period associated therewith;

receiving at least one offer for the product, the offer identifying one of the series of special prices and the corresponding effective time period;

continuing to sell the product at a list price while performing the receiving step, thereby establishing a source of alternate demand for the product;

periodically reviewing the at least one offer to determine whether to accept the at least one offer; and in which the step of reviewing comprises:

determining whether any of the identified one of the series of special prices is above a predetermined threshold.

7. A method for selling a product, comprising:

advertising a series of special prices for the product, each of the special prices having an effective time period associated therewith;

receiving at least one offer for the product, the offer identifying one of the series of special prices and the corresponding effective time period;

continuing to sell the product at a list price while performing the receiving step, thereby establishing a source of alternate demand for the product;

periodically reviewing the at least one offer to determine whether to accept the at least one offer; and in which the step of reviewing comprises:

determining whether a quantity available of the product is greater than a predetermined threshold.

8. A method for selling a product, comprising:

advertising a series of special prices for the product, each of the special prices having an effective time period associated therewith;

receiving at least one offer for the product, the offer identifying one of the series of special prices and the corresponding effective time period;

continuing to sell the product at a list price while performing the receiving step, thereby establishing a source of alternate demand for the product;

periodically reviewing the at least one offer to determine whether to accept the at least one offer; and in which the step of reviewing comprises:

determining whether sales of the product are less than a predetermined threshold.

\* \* \* \* \*